Figure 1:
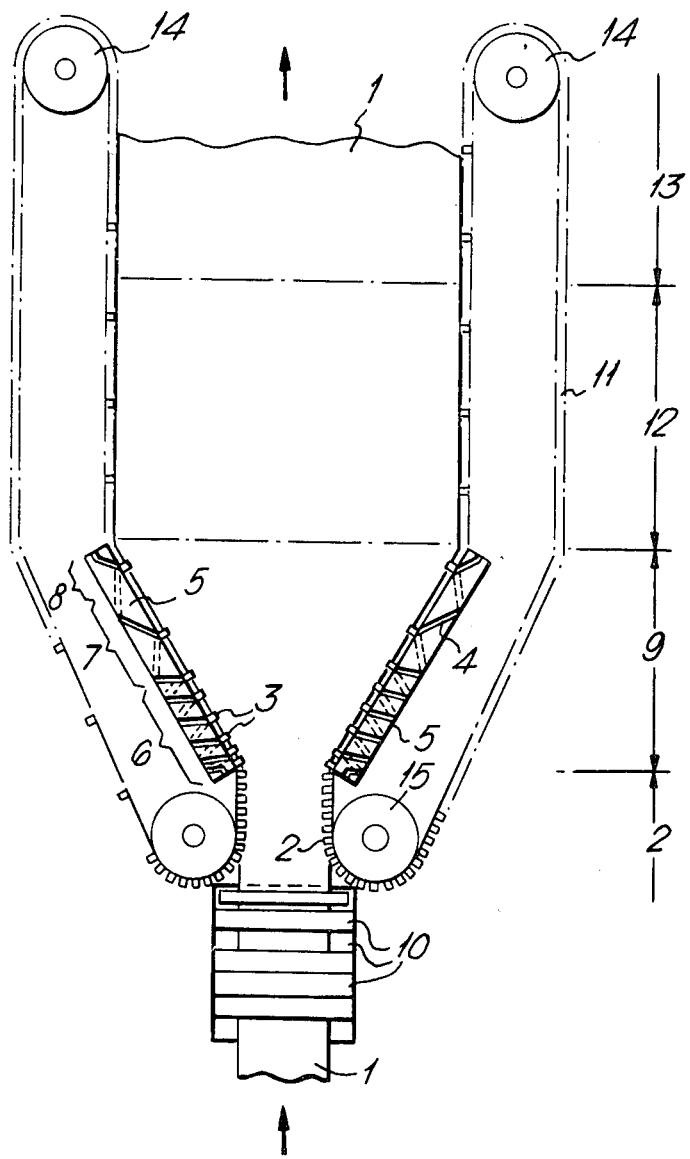

United States Patent [19]

von und zu Aufsess et al.

[11] 4,330,499
[45] May 18, 1982

[54] PROCESS AND APPARATUS FOR THE SIMULTANEOUS BIAXIAL STRETCHING OF A PLASTIC FILM

[75] Inventors: Friedrich F. von und zu Aufsess, Forchheim; Günter Huxhorn, Kirchehrenbach; Hans Pohl, Forchheim; Wolfgang Sasse, Bubenreuth, all of Fed. Rep. of Germany

[73] Assignee: Internationale Octrooi Maatschappij "Octropa" B.V., Rotterdam, Netherlands

[21] Appl. No.: 205,322

[22] PCT Filed: Dec. 11, 1979

[86] PCT No.: PCT/EP79/00098
§ 371 Date: Jun. 10, 1980
§ 102(e) Date: Jun. 10, 1980

[87] PCT Pub. No.: WO80/01149
PCT Pub. Date: Jun. 12, 1980

[30] Foreign Application Priority Data

Dec. 11, 1978 [DE] Fed. Rep. of Germany ....... 2853398

[51] Int. Cl.³ .............................................. B29C 17/02
[52] U.S. Cl. .................................. 264/289.6; 26/18.5; 26/73; 264/290.2
[58] Field of Search ............... 264/235.8, 289.6, 290.2; 26/18.5, 72, 52, 73

[56] References Cited

U.S. PATENT DOCUMENTS

| | | | |
|---|---|---|---|
| 2,618,012 | 11/1952 | Milne | 264/290.2 |
| 3,014,234 | 12/1961 | Koppehele | 264/290.2 |
| 3,046,599 | 7/1962 | Nicholas et al. | 264/290.2 |
| 3,502,766 | 3/1970 | Tsuruta et al. | 264/235.8 |
| 3,816,584 | 6/1974 | Schmidt | 264/290.2 |

FOREIGN PATENT DOCUMENTS 50-1590 1/1975 Japan ................ 264/290.2

Primary Examiner—James B. Lowe
Attorney, Agent, or Firm—Cushman, Darby & Cushman

[57] ABSTRACT

In an apparatus for the biaxial, simultaneous stretching of a flat film web from particularly polypropylene, the edges of the film web 1 are engaged by grippers 3, which in the stretching zone 9 are driven by divergent threaded spindles 5, and at least part of the stretching in longitudinal direction is effected, by means of a progressive pitch of the threaded spindles, simultaneously with part of the transverse stretching. Subsequent to the progressive pitch a thread with degressive pitch is provided, preferably at the end of the threaded spindles, effecting shrinkage of the previously stretched film web in longitudinal-direction, while preferably simultaneously the film web is further stretched in transverse direction. The shrinking of the film web takes place over about 5 to 10% of the spindle length at up to 10% of the previously produced longitudinal stretching, to the longitudinal stretching degree desired in the finished film.

10 Claims, 2 Drawing Figures

PROCESS AND APPARATUS FOR THE SIMULTANEOUS BIAXIAL STRETCHING OF A PLASTIC FILM

The invention relates to a process for the simultaneous biaxial stretching of a flat film web from plastics material, preferably from polypropylene, in which subsequent to the stretching step a slight shrinking of the film is effected, as well as to the apparatus to be used therefor.

It is known that stretched film webs can be improved by slightly shrinking them after stretching, the shrinking step normally being effected in the thermo-fixing zone and only in transverse direction. For the stretching of a polyamide film in an apparatus in which the film edges are gripped by means of a flat link conveyor guided between two rails, it has also been described to shrink the film web, after the simultaneous biaxial stretching, firstly in transverse direction and subsequently in longitudinal direction. Such a flat link conveyor however is very expensive to construct and for obtaining stretching degrees of 1:7 and more in each of the two stretching directions it is less suitable than threaded spindles which drive the grippers that grip the edges of the film web.

Shrinking the film after its stretching is required, for example, to prevent a so-called cold-shrinking of the film in wound-up position at room temperature. Cold-shrinking has particularly been observed in polypropylene films within a few hours after stretching and seems to be due to post-crystallisation of the films. A subsequent shrinking of the film web is detrimental, particularly in the direction of running of the machine in which the film web is stretched in longitudinal direction, as the film is wound up in this direction in a length of e.g. 10,000 m.

The object of the invention is to provide a process that allows shrinking of the film web, particularly in longitudinal direction, also after achieving a high stretching degree, as well as to develop an improved apparatus therefor.

The object is attained in that in a stretching apparatus in which the edges of the flat film web are retained by grippers or similar gripping means and in which the grippers are driven by means of threaded spindles, at least part of the stretching in longitudinal direction being effected, by means of a progressive pitch of the threaded spindles, simultaneously with at least part of the transverse stretching achieved by a diverging arrangement of the threaded spindles, according to the invention the film web is stretched in longitudinal direction at up to 10%, preferably 3 to 5% in excess of the longitudinal stretching degree desired in the finished film and, subsequent to the stretching effected in longitudinal direction, is shrunk to the longitudinal stretching degree desired in the finished film by guiding the grippers in a degressive thread pitch. Advantageously, simultaneously with the shrinking of the film web in longitudinal direction also a change in its dimension in transverse direction takes place. This can e.g. be effected by threaded spindles with degressive pitch, arranged in a divergent position on both sides of the film, which effects a shrinking of the film web in both directions.

In a preferred embodiment the shrinking of the film web in longitudinal direction is carried out while the film web is still being further stretched in transverse direction, the shrinking in longitudinal direction being effected at the stretching temperature. The shrinking in longitudinal direction can be relatively slight, since the simultaneous further stretching in transverse direction also contributes to a reduction of the tension peaks that are present in the film web particularly as a result of the longitudinal stretching.

An apparatus according to the invention for performing the preferred process is provided with two threaded spindles arranged divergent to each other, which for the simultaneous biaxial stretching of the film have a progressive pitch over at least part of their length, an area of degressive pitch being provided at the run-off end of the threaded spindle subsequent to the area with progressive pitch.

The threaded spindles of this apparatus are rectilinear, so that during the entire engagement of the grippers with the film an evenly increasing transverse stretching takes place, which for example for polypropylene films amounts to 1:7 or more. The longitudinal shrinking occurring owing to the degression of pitch coincides with the transverse stretching of the film, thus increasing the action of the longitudinal shrinking with regard to the removal of the tension peaks in longitudinal direction.

An advantageous embodiment of the apparatus according to the invention may consist in that at the infeed end the two threaded spindles have an area with constant pitch, i.e. without pitch progression, a subsequent area with progressive pitch and in a third area a degressive pitch.

The result of this is that the stretching in the first area is exclusively in transverse direction. In the subsequent second area the stretching is simultaneously effected in both directions, in which second area, at the same stretching ratio in both axial directions, the proportion of longitudinal stretching is predominant. In the third area of the spindles the stretching is then again exclusively transverse, while in longitudinal direction of the film a shrinking of the film is effected.

According to the invention the area at the end of the threaded spindles with degressive pitch has a maximum of about 10%, preferably about 5% of their overall length, the area with degressive pitch preferably extending over at least one thread of the threaded spindles.

According to an advantageous embodiment of the invention the pitch degression in the end section of the threaded spindles is 2 to 6%, preferably 3 to 5% of the pitch progression provided in the preceding section.

It has also appeared to be very advantageous if according to the invention the first area of the threaded spindles, in which a constant pitch is provided, occupies about 50% of the overall spindle length, whereas the area with pitch progression is from about 40 to 45% and the area of pitch degression is from about 5 to 10% of the length of the threaded spindles. With a stretching apparatus having threaded spindles thus formed it is possible to manufacture a film which, at a corresponding angle of divergence, has the same stretching degree in longitudinal and transverse directions (e.g. 1:7 each, i.e. 1:49 in the plane) and which on account of the predominant stretch in longitudinal direction has predominant strength properties in longitudinal direction at the end of the stretching zone, and in which the tension peaks, which on further processing tend to lead to film damage, have been reduced and which has no measurable cold-shrinkage in longitudinal direction.

The degressive pitch according to the invention of the threaded spindles at their run-off end can also be used for threaded spindles that have a constant progressive pitch over their total remaining length.

Whereas the grippers along the spindles are driven by the thread of the spindles, the driving at the end of the spindles is effected, for example, by a catch chain circulating at constant speed. The degressive pitch of the threaded spindles retards the grippers, so that without a jerky straining of the film web they proceed from their directions of travel, which diverge in accordance with the divergence of the threaded spindles, into directions that are about parallel to the direction of running of the machine.

Figure 2:
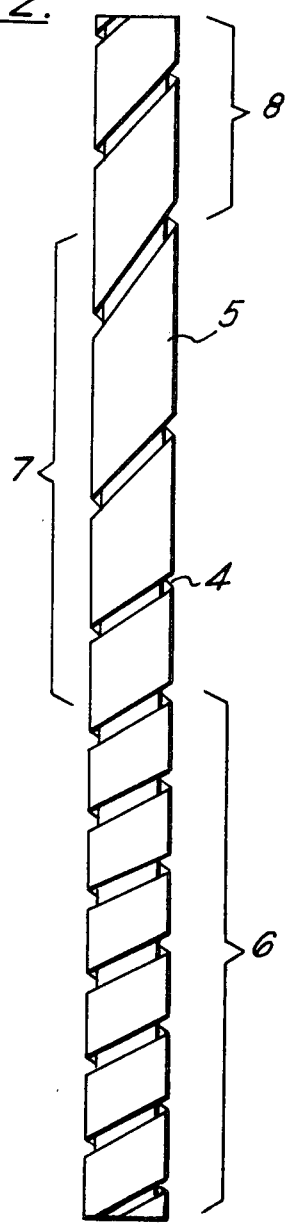

The invention will be explained below by means of an example of an embodiment. The figures show a digrammatic representation of a stretching apparatus with two threaded spindles diverging with respect to each other (FIG. 1) and a single threaded spindle of this apparatus (FIG. 2).

A flat film web 1, made for example by means of an extruder (not shown), is passed over cooling and heating rollers 10 and heated at about the stretching temperature. At the infeed end 2 of the stretching apparatus proper the film web 1 is engaged at its edges by grippers 3 and fed into the stretching zone 9. The grippers 3 engage in the threads 4 of threaded spindles 5, which are arranged divergent to each other on both sides of the stretching apparatus. The divergence of the threaded spindles 5 effects stretching in transverse direction over the overall length of the stretching zone 9. In the stretching zone 9 the temperature of the film web can be adjusted by means of heating and/or cooling devices (not shown) at the suitable stretching temperature at which a thermo-elastic stretching and an improvement of the film characteristics is possible. The threads 4 of the two spindles 5 have a constant pitch in a first area 6, constituting about half the overall length of the spindles 5, as a result of which the rotatably driven spindles 5 further convey the grippers and thus also the film web at their starting speed, i.e. without any stretching in longitudinal direction. In a second area 7, constituting about 40% of the overall length of the spindles, the pitch of the threads 4 shows a progression starting from 1:1 and increasing up to a longitudinal stretch of the film web of 1:7.35. In a third area 8, corresponding to about 10% of the spindle length, the thread pitch has a degression which, calculated on the film web, amounts to 7.35:7.0, resulting in that the film web at the run-off end of the spindle shows a stretching degree in longitudinal direction of 1:7 with respect to the starting film. In the stretching zone 9 and the subsequent thermo-fixing zone 12 the grippers are guided on guide rails (not shown). In the thermo-fixing zone 12 these rails can slightly converge with respect to each other in order to shrink the film web also a little in transverse direction, if required. The thermo-fixing zone 12, in which the film web is frequently heated at a higher temperature than the stretching temperature, is followed by a cooling zone 13, and subsequently the film is wound up, which is not further shown. By means of a transport device 11 the grippers 3 are returned from the end of the threaded spindles 5 through the thermo-fixing zone 12 and the cooling zone 13 over return pulleys 14 to the infeed end of the film web 1, where they are advanced to the edges of the film web over return pulleys 15.

In an apparatus of the type described above, however with spindles having a length of about 5 m, diverging at such an angle that at the end of the stretching zone a transverse stretch is reached of about 1:8.2, a polypropylene film of about 420 mm wide is treated between the grippers 3 at the infeed end to a width of about 3445 mm between the grippers at the end of the stretching zone at draw-off speeds of 75 to 90 m/min of the film web stretched biaxially at 0.02 mm. In the thermo-fixing zone 12 the film was shrunk, if required, to a stretching degree of about 1:8 in transverse direction. The distance, resulting in the longitudinal direction, between two grippers 3 was about 40 mm at the infeed side of the threaded spindles 5 and, owing to the thread pitch, was increased to a maximum of 302 mm, which corresponds to an increase in distance between the grippers in the direction of spindles in a ratio of 1:7.55 and a stretch of the film web in the direction of running of the machine of 1:7.22. In the area 8 at the run-off end section of the spindles 5 a shrinking of the film web in longitudinal direction of about 3% was effected, i.e. to a stretching degree of 1:7, calculated on the starting film, or in a ratio of 7.22:7, calculated on the largest longitudinal stretch in the stretching zone; the distance between the grippers in the direction of the spindles decreased to about 293 mm and the length of the degressive pitch of the thread amounted to about 6% of the overall spindle length. The longitudinal shrinkage thus produced resulted in film webs which in a cooled, wound-up position and during the further processing afterwards at about room temperature no longer showed any cold-shrinkage.

We claim:

1. In a process for the biaxial stretching of a flat film web from plastics material in a stretching apparatus in which the edges of the flat film web are retained by grippers driven by means of threaded spindles, and at least part of the stretching in longitudinal direction is being effected by means of a progressive pitch of threaded spindles simultaneously with at least part of the transverse stretching, the modification wherein the film is stretched in longitudinal direction at up to 10% in excess of the stretching degree desired in the finished film and, subsequently to the stretching in longitudinal direction, is shrunk to the desired stretching degree in longitudinal direction, while the film web is still being further stretched in transverse direction, by guiding the grippers in a degressive thread pitch.

2. Process according to claim 1, characterized in that the shrinking of the film web in longitudinal direction is carried out at the stretching temperature.

3. Process according to claim 1 or 2, characterized in that the plastics film web essentially consists of polypropylene.

4. Process according to claim 1, characterized in that in the stretching apparatus the film web is continuously stretched over the entire stretching zone to a stretching degree of at least 1:7 and owing to a progressive pitch of the threaded spindles the longitudinal stretching of the film web only begins at about 50% of the length of the stretching zone and until 90 to 95% of the length of the stretching zone results in a stretch in longitudinal direction of more than 1:7 and at the end of the stretching zone, owing to a degressive pitch of the threaded spindles, shrinking is effected to the desired stretching degree of the finished film of at least 1:7.

5. In an apparatus for the biaxial stretching of a flat film web from a plastics material including grippers which engage the edges of the film web, and threaded spindles for driving the grippers, which have a progressive pitch over at least part of their length, adapted to permit at least part of the stretching in the longitudinal direction to be carried out simultaneously with at least part of the transverse stretching, the modification wherein at the run-off end of the threaded spindles, subsequent to the progressive pitch of the threaded spindles a thread of degressive pitch is provided for the further guiding of the grippers whereby the film can be shrunk in the longitudinal direction while the film web is still being stretched transversely.

6. Apparatus according to claim 5, wherein the thread of degressive pitch is arranged on the threaded spindles themselves at their run-off end section.

7. Apparatus according to claim 6, wherein the section of the threaded spindles with the degressive pitch does not comprise more than 10% of the overall length of the spindles, said degressive pitch extending over at least one thread of the threaded spindle.

8. Apparatus according to claim 7, wherein the degressive pitch comprises about 5% of the overall length of the threaded spindles.

9. Apparatus according to claim 8, wherein the degressive pitch at the run-off end of the threaded spindles amounts to 2 to 6% of the progression of the preceding spindle.

10. Apparatus according to claim 9, wherein the threaded spindles have at the infeed end a first area of constant pitch over about 50% of the spindle length, a subsequent area comprising 40 to 45% of the spindle length which has a progressive pitch and at the end of the spindles an area of degressive pitch which comprises 5 to 10% of the spindle length.

* * * * *